United States Patent [19]

Ryser

[11] Patent Number: 4,562,999

[45] Date of Patent: Jan. 7, 1986

[54] VISE

[75] Inventor: Urs D. Ryser, Muntelier, Switzerland

[73] Assignee: Fribosa AG., Murten, Switzerland

[21] Appl. No.: 489,165

[22] Filed: Apr. 27, 1983

[51] Int. Cl.[4] .................... B23Q 3/06

[52] U.S. Cl. .................... 269/137; 269/195

[58] Field of Search .................... 269/137, 165, 189, 194, 269/195, 207, 211, 212, 213, 215, 240

[56] References Cited

U.S. PATENT DOCUMENTS

| | | | |
|---|---|---|---|
| 540,413 | 6/1895 | Vanderbeek | 269/137 |
| 2,552,738 | 5/1951 | Renner | 269/194 |
| 2,992,665 | 7/1961 | Mertz | 269/137 X |
| 4,138,100 | 2/1979 | Krummenacher | 269/137 |
| 4,243,213 | 1/1981 | Georgian | 269/137 |

FOREIGN PATENT DOCUMENTS

| | | | |
|---|---|---|---|
| 18432 | of 1904 | United Kingdom | 269/211 |

*Primary Examiner*—Frederick R. Schmidt
*Assistant Examiner*—Steven P. Schad
*Attorney, Agent, or Firm*—Brady, O'Boyle & Gates

[57] ABSTRACT

The helically threaded spindle (5) of the vise is arranged in an inclined fashion in the movable jaw (3) and is held in a pivotable as well as axially fixed manner. The spindle nut (7) is displaceably guided in a longitudinal recess (9) of the bed (1), is spring-loaded in the direction toward the fixed jaw (spring 18), and is provided with a cross pin (17). The cross pin (17) is adapted to be anchored in a series of downwardly open slots (20, 21, 22) rectangular in cross section. Upon tightening the previously released spindle (5), the pin (17) slides to the subsequent slot (21) and engages therein, whereupon the horizontal component of its obliquely upwardly direction movement pushes the movable jaw (3) forwards for clamping the workpiece (4). Upon releasing the spindle (5), the pin (17), which is moved obliquely downwardly during this step, abuts against the vertical flank of the slot (21) facing the workpiece (4) and slides therealong downwardly, the horizontal component of its movement pushing the movable jaw backwards and thereby disengages the latter from the workpiece (4).

10 Claims, 6 Drawing Figures

Fig. 3
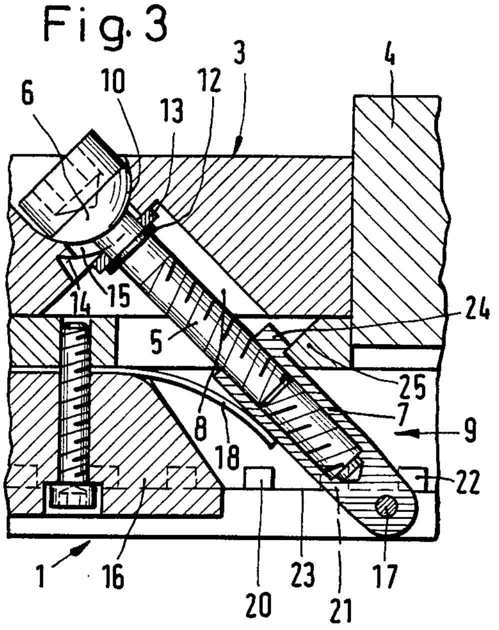
Fig. 4
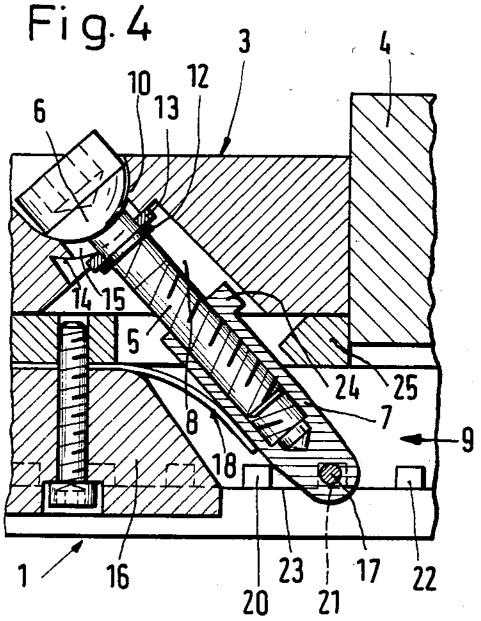
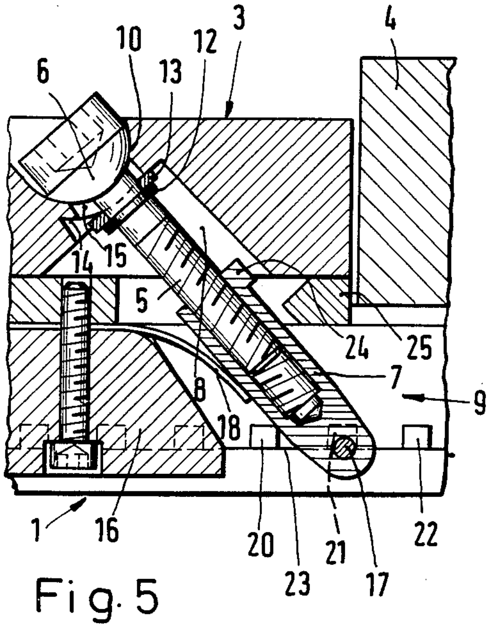
Fig. 5
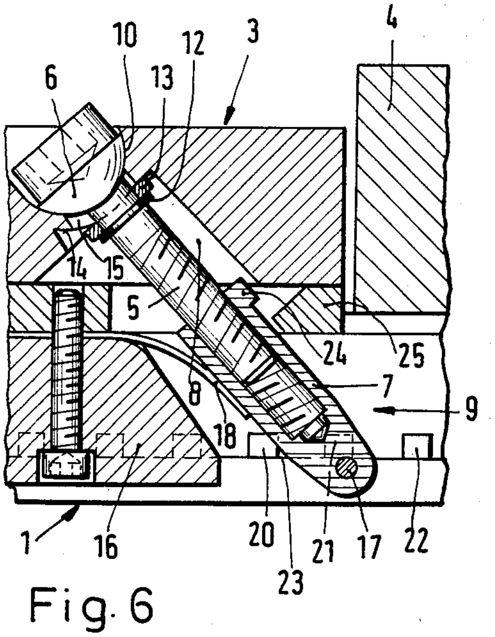
Fig. 6

VISE

BACKGROUND OF THE INVENTION

In a conventional vise such as the type shown in French Pat. No. 341,243, the spindle is equipped with the cross pin, and the spindle nut is supported against the movable jaw in the clamping direction. In order to clamp a workpiece in place, the spindle, advanced after releasing the spindle nut, must be pulled back, and the spindle nut must be tightened with the spindle held in the retracted position. In order to release the workpiece, the spindle nut must be loosened and the spindle must be pushed forward.

In another known vise, such as shown in German Pat. No. 2,652,946, the spindle nut is equipped with the cross pin; this vise does not pertain to the aforementioned kind, because two fixed jaws are provided, and the pair of elements accordingly is not spring-loaded in the pivoting direction toward a fixed jaw. Between the spindle head and the movable jaw, a spring is effective which lifts the spindle in the direction of its axis. In order to clamp a workpiece in place, the released spindle must be depressed against the spring force, pivoted into the inclined position to be used, released, and thereafter must be tightened. In order to free the workpiece, the spindle must be released and depressed.

The invention as disclosed herein solves the problem of providing a vise which, while retaining the advantageous properties of the vises of the aforementioned type, can be manufactured without appreciable additional expenditure, but can be operated more easily and more quickly. In the vise according to this invention, it is sufficient for clamping a workpiece in position to tighten the spindle (or the spindle nut) and for releasing the workpiece to release the spindle (or the spindle nut), without it being necessary to additionally shift the spindle and hold same in the displaced position.

In the conventional vises (French Pat. No. 341,243; German Pat. No. 2,652,946), the releasing of the spindle merely disengages the anchorage of the cross pin in the series of slots; however, thereafter, the movable jaw cannot as yet be readily shifted backwards by hand, if it has jammed in the base due to an excessive tension force (if it has become canted in the guide due to the occurring torque). The pair of elements in these conventional vises cannot exert a force which would push the movable jaw back during release of the spindle, because the slot flank facing the fixed jaw extends approximately in the direction of the spindle, and the spindle nut or spindle head is supported against the movable jaw only for tightening purposes, but this nut or head can be lifted off its supporting surface (in the vise according to German Pat. No. 2,652,946, the spindle head is lifted off its supporting surface by the spring during loosening of the spindle).

SUMMARY OF THE INVENTION

In the vise of the present invention, the movable jaw, during rotational release of the spindle, is pushed back by the pair of elements by unscrewing the pair of elements, thus acting as a helical gear transmission and by the flank or wall of the slot which cooperates with the cross pin thereof as an "inclined plane" (thus, a torque is exerted directed in opposition to the torque prevailing during clamping of the workpiece). Thereby, the movable jaw is loosened, released, and somewhat pushed back. This movable jaw can thereafter be readily shifted manually, even if it had seized to a considerable extent.

The vise of the invention is suitably designed with transverse slots, the depth of which is larger than the radius of the cylindrical cross pin, and the cross section of which is rectangular or of the shape of an inverted "U".

In the conventional vise of the present type (French Pat. No. 341,243), a user cannot recognize whether the spindle nut has been released to such an extent that the movable jaw is freely displaceable. If the nut has not been sufficiently released, and the spindle has advanced until the nut abuts against its supporting surface, then the cross pin will disengage from the slot, but will engage into the next slot, due to the spring action, upon a shifting of the movable jaw.

In the structure of the vise of the invention, the spindle need only be loosened by an unscrewing operation up to abutment of a lug on the spindle nut with a shoulder on the movable jaw, whereupon the cross pin, in spite of the spring load, cannot engage into the slot, or can engage only when the spindle is being tightened again.

It makes no difference in the present context whether, for releasing the spindle, the spindle proper is rotated or the spindle nut is turned, i.e. whether the spindle nut is provided with the cross pin and the spindle head is held in the movable jaw, or, in a kinematic reversal, the spindle is equipped with the cross pin and the spindle nut is held in the movable jaw.

BRIEF DESCRIPTION OF THE DRAWINGS

The invention is described in greater detail hereinafter following with reference to drawings showing merely one embodiment thereof, wherein:

FIGS. 3–6 show respectively partial vertical longitudinal section views of the vise, taken substantially on line A-B in FIG. 2, in various position during the clamping and releasing of a workpiece, the views being shown on an enlarged scale.

DESCRIPTION OF THE PREFERRED EMBODIMENT

Figure 1:
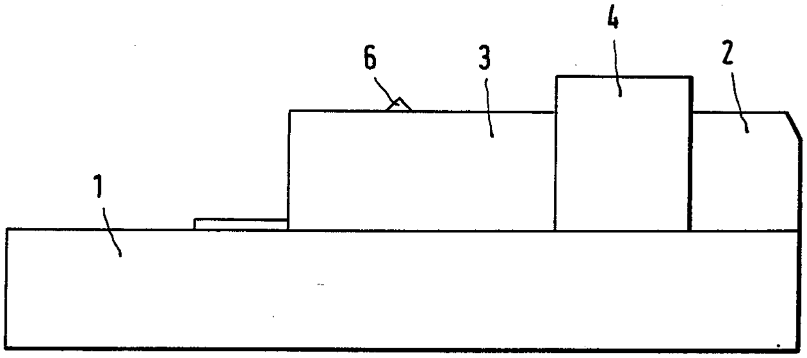
FIG. 1 shows a lateral view of a vise with a workpiece clamped in position.
Figure 2:
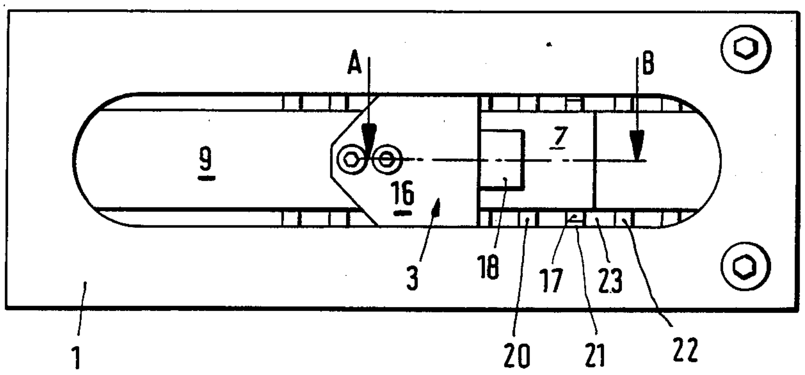
FIG. 2 shows a bottom view of FIG. 1.

In the drawings, 1 denotes the bed (base member), 2 is the fixed jaw, 3 is the movable jaw, namely a jaw displaceable along the bed 1 in a parallel guide (not shown), 4 denotes a workpiece clamped between the jaws 2 and 3, 5 is the inclined spindle with the spindle head 6, and 7 denotes the spindle nut. The pair of elements consisting of the spindle 5 and the spindle nut 7 is arranged at the top in a hollow space 8 of the movable jaw 3 and at the bottom in a longitudinal recess 9 of the bed 1 to be pivotable in the longitudinal direction of the bed and fixed in the axial direction. For this purpose, a spherical surface of the spindle head 6 is supported on a curved surface 10, and a ring 13, held in opposition to the head 6 at the spindle 5 by means of a spring ring 12 on spindle 5, rests on a surface 14 coaxial with respect to the surface 10, and the spindle is arranged between the head 6 and the ring 13 in a slotted hole 15. The spindle nut 7, just as a portion 16 of the movable jaw 3, is displaceably guided in the longitudinal recess 9 of the bed. The lower end of the spindle nut 7 is provided with a cylindrical cross pin 17 projecting on both sides past the spindle nut 7. The spindle nut 7 is stressed by a leaf spring 18 which tends to pivot the spindle 5, together with the spindle nut 7, toward the fixed jaw 2. The bed 1 exhibits, on both sides of the longitudinal recess 9, a series of cross slots, for example 20, 21, 22, of rectangular cross section and open at the bottom; these cross slots are arranged in paired opposition in order to accommodate the cross pin 17. The depth of the slots 20, 21, 22 is larger than the radius of the pin cross section. The cross section of the slots can also be rounded at the top, i.e. have the shape of an inverted "U", (not shown).

If the spindle 5 is released in an arbitrary position of the movable jaw 3, wherein the pin 17 is either entirely or partially within one of the slots or is urged, between two slots, by the spring 18 against the surface 23 wherein the slots are formed, then the spindle nut 7 is exposed to the advance impetus provided by the spindle 5 and to the bias of the spring 18. The spindle nut 7 moves downwardly and pivots (about the spindle head 6) toward the right as seen in the drawing. During this step, a shoulder formed at the spindle nut 7 by a lug 24 abuts against a corner 25 formed in the hollow space 8 of the movable jaw 3, if the pin 17 has a small spacing from the surface 23. In this condition, shown in FIG. 3, the pin 17 cannot engage in one of the slots; the jaw 3 is freely movable.

If the jaw 3 is advanced until it abuts against the workpiece 4, the pin 17 generally is not located in front of one of the slots, but rather, for example as shown in FIG. 3, in front of the surface 23 between the slots 21 and 22. During tightening of the spindle 5, the pin 17 first contacts the surface 23, is urged against this surface by the spring 18, and slides therealong until, during the further tightening of the spindle 5, the pin is forced by the spring 18 into the slot 21 and, during additional tightening of the spindle 5, is urged against the left flank of this slot 21, as seen in the drawing, FIG. 4. Thereby the movable jaw 3 is pressed against the workpiece 4, which latter is supported, in oposition to this jaw 3, against the fixed jaw 2 (FIG. 1).

Upon releasing of the spindle 5, the pin 17 first is disengaged from the left flank of the slot 21, because the spacing between the pin 17 and the spindle head 6 becomes larger and the spring 18 is active. Under this effect, the pin 17 then abuts against the right-hand flank of the slot 21, and during the further release of the spindle 5, the pin 17 slides downwardly along this slot flank; in this connection, the horizontal component of the movement of the pin, leading obliquely downwardly, has the effect that the movable jaw 3 is pushed back, as illustrated in FIGS. 5 and 6. A prerequisite for this, besides the vertical extension of the slot flank, is that the spring 18 holds the pin 17 against the right-hand flank of slot 21. Finally, the pin 17 leaves the slot 21, and slides toward the right along the surface 23 until the shoulder of the spindle nut 7, formed by the lug 24, abuts against the corner 25. Thereby the movable parts of the displaceable jaw 3 return to the position shown in FIG. 3; the jaw 3 is freely movable.

During the backwards pushing of the jaw 3 is effected by the release of the spindle 5, the ratio of spindle rotation to the horizontal component of the path traveled by pin 17 is determined by the pitch of the spindle thread and by the inclination of the spindle 5 and is proportionately very large. Therefore, without appreciable effort, a considerable force for relasing the jaw 3 can be exerted, and this jaw 3 can also be readily released even if it has jammed, in case of a high clamping force, in its parallel guide (not shown).

I claim:

1. A vise comprising a bed (1), a fixed jaw (2) on said bed, a movable jaw (3) movable along said bed, a pair of elements (5,7) consisting of an inclined helically threaded spindle (5) and a spindle nut (7) movably engaged therewith, a series of downwardly open transverse slots (20, 21, 22) on said bed (1), said bed (1) extending in the longitudinal direction of movement of said movable jaw (3), one element (5) of said pair of elements being supported in the movable jaw (3) for the pivotal mounting of the element pair (5, 7) thereon, a cross pin (17) on the other element (7) of said pair of elements, said other element (7) of said pair of elements being selectively retainable by means of said cross pin (17) in respectively one slot of said series of downwardly open transverse slots (20, 21, 22) of the bed (1), each of said slots (20,21,22) having a pair of faces, one of said faces of said pair of faces is opposite to the fixed jaw (2), whereby, with said cross pin (17) retained in one of said slots (20, 21, 22), upon tighting said spindle (5), said cross pin (17) is urged against said one face of said pair of faces of the respective slot, thereby moving the movable jaw (3) forwards (FIG. 4), a spring (18) connected between the movable jaw (3) and said pair of elements for biasing said pair of elements (5, 7) in the direction of its pivotal movement about said pivotal mounting toward said fixed jaw (2), said one element (5) of said pair of elements (5, 7) that is supported in the movable jaw (3) is connected in an axially fixed position on said movable jaw (3), the other face of said pair of faces of each slot is on the side of the slot closest to the fixed jaw (2) and is planar at least in a zone adjoining the open side of the slot and extends at least approximately perpendicularly to the longitudinal axis of the bed (1), and said transverse slots (20, 21, 22) are of such a depth and said spring (18) of such a dimension that with said cross pin retained in one of said slots (20, 21, 22), said spring, upon release of said spindle (5), holds said cross pin (17) on said other face of the respective slot facing the fixed jaw, so that the movement of said cross pin (17) acting on the planar face of the slot, pushes said movable jaw (3) backwards (FIG. 5) away from said fixed jaw (2).

2. A vise according to claim 1, in which the depth of said transverse slots (20, 21, 22) is greater than the radius of said cross pin (17).

3. A vise according to claim 1, in which the cross section of said transverse slots (20, 21, 22) is at least approximately rectangular.

4. A vise according to claim 1, in which said bed (1) includes a bottom plane portion (23) in which said downwardly open transverse slots (20, 21, 22) are formed, the other element (7) of said pair of elements (5, 7) carrying a protrusion (24) and having said cross pin (17), a shoulder (25) on said movable jaw (3), whereby when said spring (18) holds the pair of elements (5, 7) in an end position of the range of pivoted movement of the pair of elements (5, 7), axial advance of said other element (7) by rotation of said one element (5) is limited by said protrusion (24) on said other element (7) moving into abutment with said shoulder (25) in a position in which the corss pin (17) is out of contact with and below said bottom plane portion (23) on which the slots (20, 21, 22) are formed (FIG. 3).

5. A vise according to claim 1, in which said spindle nut (7) is equipped with said cross pin (17), said spring (18) is connected to bias said spindle nut (7), said bed (1) having a longitudinal recess (9) therein, said spindle nut (7) extending into and displaceably guided in said longitudinal recess (9) of said bed (1), said spring (18) extending into said longitudinal recess (9) of said bed (1), and a spindle head (6) on said inclined helical spindle (5) which is pivotally supported on said movable jaw (3) in an axially fixed manner.

6. A vise comprising a bed (1), a fixed jaw (2) on said bed, a movable jaw (3) movable along said bed, a pair of elements (5, 7) consisting of an inclined helically threaded spindle (5) and a spindle nut (7) movably engaged therewith, a series of downwardly open transverse slots (20, 21, 22) on said bed (1), said bed (1) extending in the longitudinal direction of movement of said movable jaw (3), one element (5) of said pair of elements being supported in the movable jaw (3) for the pivotal mounting of the element pair (5, 7) thereon, a cross pin (17) on the other element (7) of said pair of elements, said other element (7) of said pair of elements being selectively retainable by means of said cross pin (17) in respectively one slot of said series of downwardly open transverse slots (20, 21, 22) of the bed (1), a spring (18) connected between the movable jaw (3) and said pair of elements for biasing said pair of elements (5, 7) in the direction of its pivotal movement about said pivotal mounting toward said fixed jaw (2), said one element (5) of said pair of elements (5, 7) that is supported in the movable jaw (3) is connected in an axially fixed position on said movable jaw (3), said bed (1) includes a bottom plane portion (23) in which said downwardly open transverse slots (20, 21, 22) are formed, the other element (7) carrying a protrusion (24) and having said cross pin (17), said movable jaw (3) provided with a shoulder (25), whereby when said spring (18) holds the pair of elements (5, 7) in an end position of the range of pivoted movement of the pair of elements (5, 7), axial advance of said other element (7) by rotation of said one element (5) is limited by said protrusion (24) moving into abutment with said shoulder (25) in a position in which the cross pin (17) is out of contact with and below said bottom plane portion (23) on which the slots (20, 21, 22) are formed (FIG. 3).

7. A vise according to claim 6, in which each of said slots (20, 21, 22) having a pair of faces, one of said faces of said pair of faces is opposite to the fixed jaw (2), whereby, with said cross pin (17) retained in one of said slots (20, 21, 22), upon tightening of said spindle (5), said cross pin (17) is urged against said one face of said pair of faces of the respective slot, thereby moving the movable jaw (3) forward (FIG. 4), said other face of said pair of faces which faces the fixed jaw (2) is planar at least in a zone adjoining the open side of the slot and extends at least approximately perpendicularly to the longitudinal axis of the bed (1), and said transverse slots (20, 21, 22) are of such a depth and said spring (18) of such a dimension that with said cross pin (17) retained in one of said slots (20, 21, 22), said spring, upon release of said spindle (5) holds said cross pin (17) on said other face of the respective slot facing the fixed jaw, so that the movement of said cross pin (17) acting on the planar face of the slot, pushes said movable jaw (3) backward (FIG. 5).

8. A vise according to claim 6, in which the depth of said transverse slots (20, 21, 22) is greater than the diameter of said cross pin (17).

9. A vise according to claim 6, in which the cross section of said transverse slots (20, 21, 22) is at least approximately rectangular.

10. A vise according to claim 6, in which said spindle nut (7) is equipped with said cross pin (17), said spring (18) is connected to bias said spindle nut (7), said bed (1) having a longitudinal recess (9) therein, said spindle nut (7) extending into and displaceably guided in said longitudinal recess (9) of said bed (1), said spring (18) extending into said longitudinal recess (9) of said bed (1), and a spindle head (6) on said inclined helically threaded spindle (5) which is pivotally supported on said movable jaw (3) in an axially fixed manner.

* * * * *